July 12, 1938.   G. D. SPENCER   2,123,479
FILLING AND VENT PLUG FOR ELECTRIC STORAGE BATTERIES Filed Nov. 4, 1935

G. D. Spencer
Inventor

Patented July 12, 1938

2,123,479

UNITED STATES PATENT OFFICE 2,123,479

FILLING AND VENT PLUG FOR ELECTRIC STORAGE BATTERIES

George Douglas Spencer, Birmingham, England, assignor to Joseph Lucas Limited, Birmingham, England Application November 4, 1935, Serial No. 48,218
In Great Britain April 2, 1935

2 Claims. (Cl. 136—177)

This invention has for its object to provide an improved filling and vent plug for electric storage batteries.

The invention comprises a hollow plug having associated with its outer end a cup through which liquid can be poured into the battery case, the said cup being also adapted to collect liquid escaping through the plug and allow it to drain back into the case.

The invention also comprises the combination with a plug as aforesaid, of a fluid level indicator in the form of a glass piece having its inner end shaped to a prismatic, conical or other suitable form.

In the accompanying sheet of explanatory drawing:—

Figure 1:
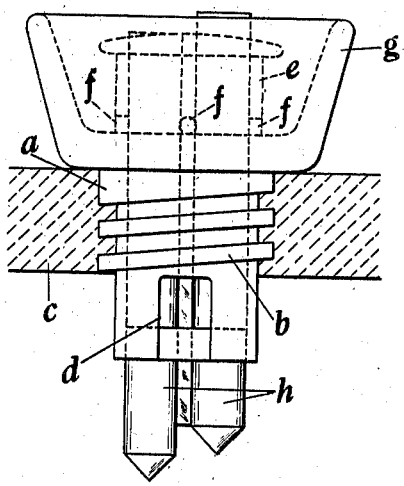
Figure 2:
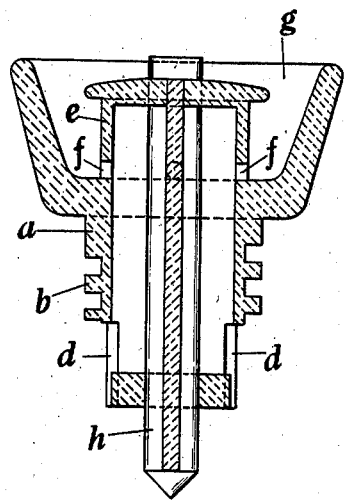
Figure 3:
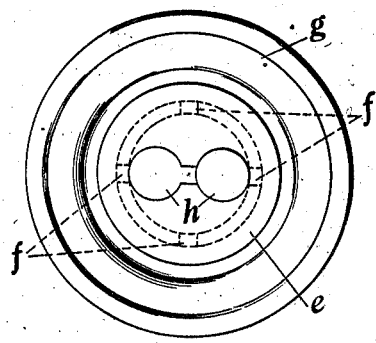

Figure 1 is a side elevation, Figure 2 a vertical section and Figure 3 a plan of a vent plug constructed in accordance with this invention.

In carrying the invention into effect I provide a hollow plug $a$ of porcelain or other acid resisting material which is provided with a screw thread $b$ adapted to be screwed into a correspondingly threaded aperture in the top $c$ of the battery case. The lower end of the plug which enters the case is closed, the entrance or exit to and from the hollow interior of the plug is provided by side openings $d$ near the closed end. The upper or outer end of the plug is formed or provided with a hollow central projection $e$ having a vent hole or holes $f$ in its side, and around this projection is formed or otherwise provided on the plug a cup $g$ for receiving liquid which is carried or escapes through the vent holes $f$. Liquid accumulating in the cup can drain back to the interior of the battery through the said openings $f$ and $d$.

The cup $g$ extends above the end of the central projection $e$. Also if desired the said projection may be made removable from the plug and may be secured in the end of the latter in any convenient manner.

The plug may also be used for replenishing the battery by pouring liquid into the cup, the liquid passing into the battery through the passages above mentioned in the interior of the plug.

Preferably I combine with the plug means for indicating the level of the liquid in the battery case. In the example illustrated by the drawing, I mount coaxially or otherwise within the plug a cylindrical glass or other transparent body $h$ having its inner end shaped to reflect light passing down the body, the outer end being flat. It is advantageous to employ two such bodies arranged side by side and having their inner ends situated at different levels. In the example shown the inner end of each of the said bodies is in the form of a right-angle cone.

The indicator is such that when viewed from above a bright appearance is observed when the fluid level in the battery is below the indicator, the indicator appearing black when its lower end is immersed. When two reflecting bodies are arranged as shown one of them gives the black appearance before the other and thus enables the filling of the case with liquid to be easily regulated.

By this invention I am able to obviate the disadvantages associated with ordinary vent or filling plugs, and also to provide a liquid level indicator in a ready and convenient manner.

Having thus described my invention what I claim as new and desire to secure by Letters Patent is:—

1. A filling and vent plug for an electric storage battery case, comprising the combination of a hollow body portion adapted to be screwed into the top of the battery case and having a closed inner end, lateral openings being provided in said body portion near its closed inner end, a cup surrounding the outer end of said body portion and forming a permanently open mouth whereby liquid can be caused to flow into the interior of said body portion from which the liquid passes into the battery case through said lateral openings, said cup also serving to receive liquid escaping from the battery case through said body portion, and a hollow part situated in said cup over the outer end of said body portion so as to form an extension of the latter, said hollow part having a closed outer end beyond which said cup projects outwardly, and being provided at a position remote from its closed end with lateral openings leading to the interior of said cup.

2. A filling and vent plug as claimed in claim 1 and comprising a transparent liquid level indicator extending through and rigidly supported by the closed inner end of said body portion and the closed outer end of said hollow part, said indicator being arranged to extend beyond the inner end of said body portion, and the inner end of said indicator being shaped to reflect upwardly light passing down the indicator.

GEORGE DOUGLAS SPENCER.